Aug. 18, 1925.  
J. F. BOLGIANO  
BASKET PARACHUTE RELEASE DEVICE  
Filed Oct. 24, 1923   2 Sheets-Sheet 2
1,550,495
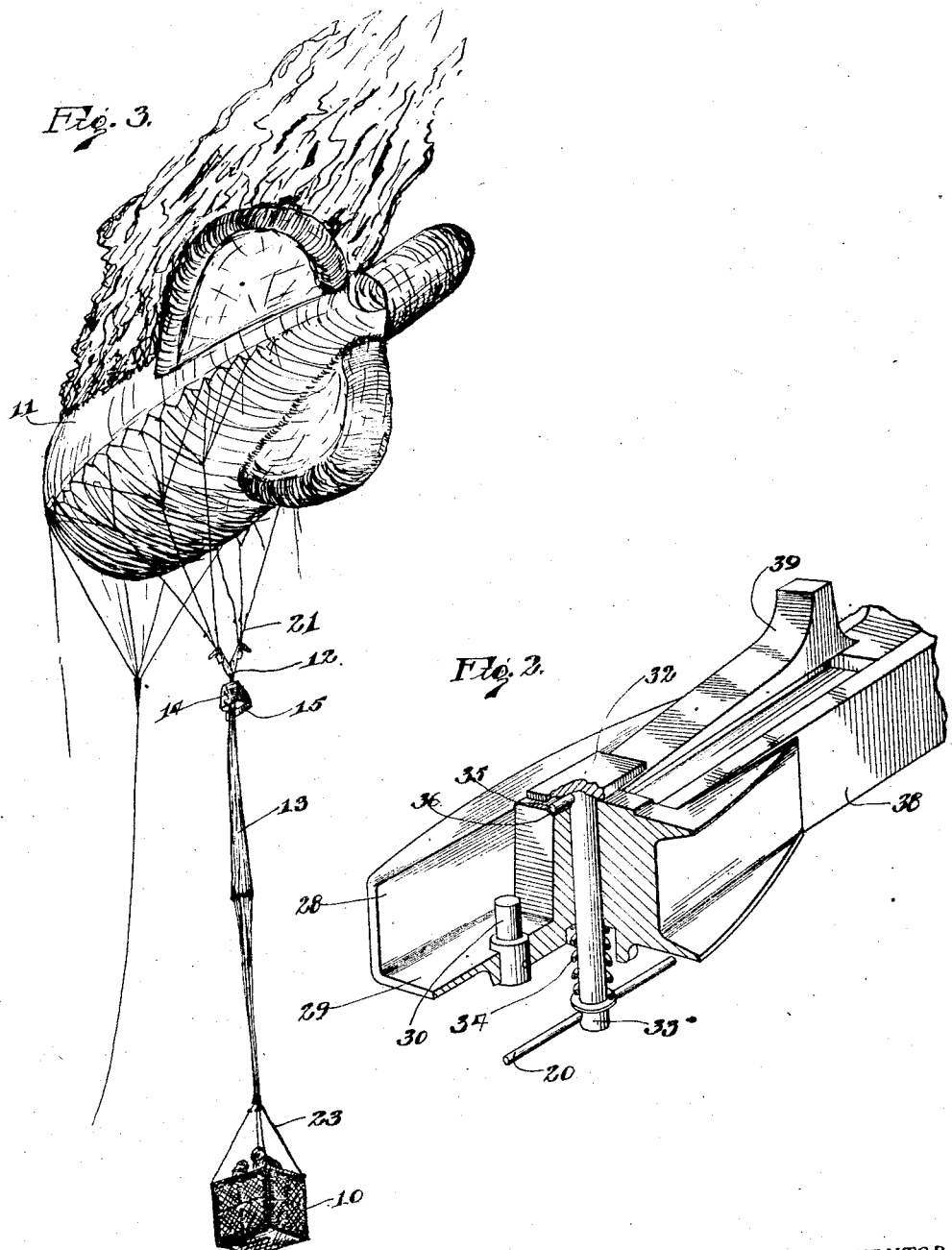
INVENTOR  
John F. Bolgiano  
BY Robert H. Young  
ATTORNEY Patented Aug. 18, 1925.

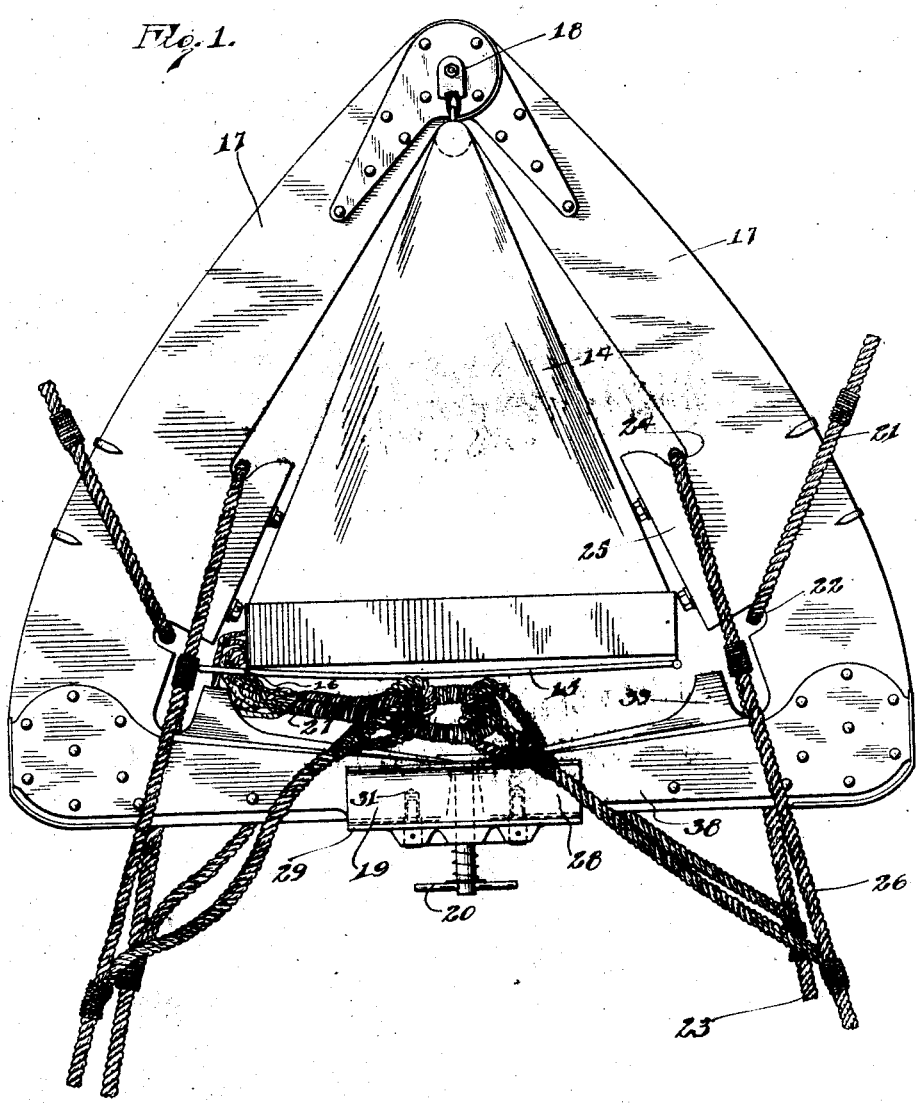

1,550,495

UNITED STATES PATENT OFFICE.

JOHN F. BOLGIANO, OF DAYTON, OHIO.

BASKET PARACHUTE RELEASE DEVICE.

Application filed October 24, 1923. Serial No. 670,538.

*To all whom it may concern:*

Be it known that I, JOHN F. BOLGIANO, a citizen of the United States, residing at Dayton, in the county of Montgomery and State of Ohio, have invented certain new and useful Improvements in Basket Parachute Release Devices, of which the following is a specification.

This invention relates to a basket release device for use in connection with observation balloons particularly, but capable of use generally wherever passenger-carrying cars or baskets having parachutes or other descent retarding devices are releasably attached to air craft.

The principal object of the invention is to provide a reliable, quickly operating device of this character, which is carried entirely by the balloon or other sustaining element so that the basket in descending is not encumbered with unnecessary weight, and there is no danger of the occupants being injured by having a releasing device or any parts thereof falling upon them.

The invention embraces other objects, as for example improvements in structural details which will be brought out in the course of the following description.

Referring to the drawing illustrating the invention, Fig. 1 is an enlarged side elevation of the release device shown in cocked or holding position and showing further the balloon rigging and basket rigging in operative relation. Fig. 2 is a perspective detail on a still further enlarged scale showing a manually operated locking device under the control of the aeronaut for releasing the basket. Fig. 3 is a graphic illustration of the manner in which the basket descends when released and showing also the release device in released condition.

The basket or car or other form of passenger carrier 10 of the balloon or other sustaining element 11, is releasably connected thereto by the release device indicated generally by the numeral 12. The basket is arranged when released in an emergency to descend retarded by a parachute 13. The parachute is normally packed in the container 14 in the release device 12 and held therein suitably by a trap door 15 held in place by a rupturable cord or other means indicated at 16.

The release device comprises a pair of angular frame members 17, of approximately V or L shape, pivotally connected at 18 and forming together an approximately triangular frame unit, quickly detachable and held intact by a locking device 19 operated manually by a handle 20 within easy reach of the aeronaut from the basket 10. The balloon rigging 21 is permanently connected to the frame 17 at the sides of the triangle frame adjacent the base of the triangle as shown, by being looped about the frames and engaged in notches 22 therein. The basket rigging 23 is connected to the frame members 17 by a slip-off connection such as that provided by engagement in the notches 24 in the upper edges of lugs 25 projecting from the inner edges of the frame members 17. This connection for the basket rigging is afforded by looped extensions 26 spliced or otherwise united with the ropes constituting the basket rigging, the latter being connected by loops to the rigging 27 of the parachute 13. The basket rigging and the balloon rigging exert in operation constant tension on the frame members in the form of a pair of force couples tending to swing them apart about the pivotal connection 18 and thereby release the basket 10 for descent to the ground. This is apparent in Fig. 1 in which it will be seen that the balloon rigging 21 exerts an outward and upward pull on each of the frame members while the basket rigging exerts a generally downward pull thereon tending to swing the frame members 17 about their pivotal connection 18 and move the apex of the triangle frame unit downward toward the collapsed position shown in Fig. 3. However, so long as the locking device 19 is in position to hold the unattached ends of the frame members 17 together as shown in Fig. 1 the basket is securely held from release.

The locking device 19 is composed principally of an aluminum casting interposed between the unattached ends of the frame members 17 at the middle of the base of the triangular frame as shown and has flanges 28 forming with a bottom wall 29 a pair of opposed recesses to receive the ends of the frame members. Posts 30 in the wall 29 extend vertically upward to engage in holes 31 in the ends of the frame members to serve to lock the latter together so long as the locking device is not withdrawn downwardly away from the releasing device as a whole by the aeronaut. The locking device is held in place with the posts in holding position by a latch 32 on the upper end of the shaft 33 in which the handle 20 is provided. The latch 32 is yieldingly urged downwardly with the shaft 33 by a coiled tension spring 34 on the shaft 33 acting between the handle 20 and the lower side of the locking device. The latch 32 when in the position shown in Fig. 2 has its ends overlying the ends of the frame members 17 so that downward movement of the locking device is prevented. However, when the handle 20 is turned through approximately 90 degrees the latch 32 is turned to withdraw the ends from overlapping relation to the frame members and downward movement of the locking device is permitted. As a precaution against accidental turning of the handle 20, the pin 35 is preferably provided to drop in a notch 36 under the action of the spring 34 when the latch 32 is moved to its locked position. A pair of wedge shaped blocks 39 setting on top of the unattached ends of the frame members 17 between plates 38, have one end engaged under the overlying ends of the latch 32 and have their free ends of enlarged proportions as shown at 39 to lie adjacent the looped extensions 26 of the basket rigging 23 to avoid the accidental displacement thereof from the notches 24 due to a jarring of the basket when the latter touches the ground, either in taking off or landing. These blocks fall out of the way, free of the releasing device when the basket is released, so that the basket rigging slips freely off the release device.

I claim:

1. In combination, a sustaining device, a passenger carrier having descent-retarding means, a trap frame supported from and remaining with said sustaining device for releasably interconnecting the riggings of said device and said carrier, said frame providing a hook for detachably connecting the carrier rigging, and means under manual control from said passenger carrier for holding said frame set until the desired moment of releasing said carrier when the hook is allowed to become inverted.

2. In combination, a sustaining device, a passenger carrier having descent-retarding means connected thereto, a trap frame, rigging on said sustaining device permanently connected to said frame, rigging on said passenger carrier releasably connected thereto with to slip off when said trap frame is released, said riggings keeping said frame under constant tension toward opening in operation, and means under manual control from said passenger carrier for holding said frame set until the desired moment to release said carrier.

3. In combination with an aerostat, and a basket carrier having a parachute attached thereto, a trap device for releasably interconnecting the riggings of said aerostat and said basket comprising a pair of frames of approximately V or L shape having pivotal connection by a leg of each frame and having a quickly detachable connection operable by hand from said basket for the other legs of said frames, said aerostat having its rigging permanently connected to said frames and said basket having its rigging detachably engaged on said frames for disconnection when said trap device collapses upon being released, the manner of connection of said riggings normally keeping said device under tension toward collapsing, and a locking member under manual control from said basket for keeping said trap device intact until the desired moment of releasing said basket.

4. A basket parachute release device comprising a pair of angular frames pivotally connected by a leg of each frame forming together approximately a triangle frame unit with the pivotal connection as the vertical apex, aerostat rigging permanently connected to said frames on the two sides of said triangle, rigging for said basket detachably engaged on said frames alongside said other rigging connections to become detached from said frames in releasing said basket, said riggings pulling oppositely in operation tending to swing said frames on their pivotal connections to release the rigging for said basket, and a manually-removable locking member at the base of the triangle frame for quickly detachably connecting the unattached legs of said frames.

5. A basket parachute release device comprising a pair of angular frames pivotally connected by a leg of each frame forming together in operative relation an approximate triangle with the pivotal connection as the vertical apex, aerostat riggings attached to the frames on the two sides of the triangle exerting tension outwardly and upwardly in operation, basket riggings detachably engaging said frames exerting a downward tension in operation which with the tension exerted by said aerostat riggings tends normally to open said frames and swing the same relative to each other on their pivotal connection, and a locking member for quickly detachably connecting the unattached legs of said frames.

6. A basket parachute release device comprising a pair of pivotally connected angular frames forming together an approximate triangle with the pivotal connection as the vertical apex, a parachute container supported within said frames at said pivotal connection, a basket parachute in said container, a basket rigging connected thereto and having a slip-off engagement on one leg of each frame, an aerostat rigging having permanent connections thereon exerting with said basket rigging tensions on said frames tending to move them and release said basket rigging, and a manually removable locking member operable from said basket at the desired moment for releasably securing said frames in holding position.

7. In a release device for basket parachutes and the like, the combination of a sustaining rigging, a parachute or basket rigging, and means for detachably interconnecting the riggings comprising a frame permanently connected with one of said riggings at one point, and having the other rigging detachably engaged thereon at another point so spaced as to provide by the tension of the riggings a force couple tending to turn said frame and effect the release of the detachable rigging, and means for detachably holding said frame against turning.

8. In a release device for basket parachutes and the like, the combination of a pair of supporting riggings, a pair of parachute or basket riggings, and means for detachably interconnecting said riggings comprising a pair of hinged frames permanently secured to one pair of riggings and having the other pair of riggings detachably engaged on said frames, the points of attachment of said riggings on each of said frames being spaced so the tension of the riggings forms a pair of force couples on the frames, tending to produce a hinging movement thereof toward releasing the detachable riggings, and means for detachably holding said frames cruxed with the detachable riggings engaged on said frames.

9. In a release device for basket parachutes or the like, the combination of a pair of supporting riggings, a pair of parachute or basket riggings, and means for detachably interconnecting said riggings comprising a pair of hinged frames permanently secured to one pair of riggings and having the other pair of riggings detachably engaged thereon, said frames being cocked in supporting position against the tension of said riggings which tend normally to produce a hinging movement of the frames toward releasing the detachable riggings, said frames having arms extending in juxtaposition for detachable connection, and a manually operable locking device for detachably interconnecting said arms comprising a plate extending across the junction of the arms and a latch insertible between said arms and rotatable into holding position across the junction of the arms on the opposite side from the plate.

In testimony whereof I affix my signature.

JOHN F. BOLGIANO.